(12) United States Patent
Back

(10) Patent No.: US 7,133,174 B2
(45) Date of Patent: *Nov. 7, 2006

(54) CONTACT LENS HAVING A UNIFORM HORIZONTAL THICKNESS PROFILE

(75) Inventor: Arthur Back, Danville, CA (US)

(73) Assignee: CooperVision, Inc., Fairport, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/188,190

(22) Filed: Jul. 22, 2005

(65) Prior Publication Data
US 2005/0254005 A1 Nov. 17, 2005

Related U.S. Application Data

(63) Continuation of application No. 10/827,168, filed on Apr. 19, 2004, now Pat. No. 6,971,746, which is a continuation of application No. 10/171,718, filed on Jun. 14, 2002, now Pat. No. 6,857,740, which is a continuation of application No. 09/818,244, filed on Mar. 27, 2001, now Pat. No. 6,467,903.

(60) Provisional application No. 60/193,493, filed on Mar. 31, 2000.

(51) Int. Cl.
G02C 7/04 (2006.01)
(52) U.S. Cl. .............................. 359/160 H; 351/160 R; 351/161
(58) Field of Classification Search ............ 351/160 R, 351/160 H, 161, 162, 177
See application file for complete search history.

(56) References Cited

U.S. PATENT DOCUMENTS

| 2,544,246 | A | 3/1951 | Butterfield |
| 4,084,890 | A | 4/1978 | Baron |
| 4,095,878 | A | 6/1978 | Fanti |
| 4,254,065 | A | 3/1981 | Ratkowski |
| 4,310,225 | A | 1/1982 | Davis |
| 4,418,991 | A | 12/1983 | Breger |
| 4,525,043 | A | 6/1985 | Bronstein |
| 4,573,774 | A | 3/1986 | Sitterle |

(Continued)

FOREIGN PATENT DOCUMENTS

CA 2096706 11/1994

(Continued)

OTHER PUBLICATIONS

Edwards, Optician, No. 5695, vol. 217, Apr. 2, 1999, p. 18-27.

(Continued)

Primary Examiner—Scott J. Sugarman
(74) Attorney, Agent, or Firm—Stout, Uxa, Buyan & Mullins; Frank J. Uxa; Greg S. Hollrigel

(57) ABSTRACT

A contact lens having a rotational stabilization mechanism thereon, such as prism ballast, and a thickness profile that reduces the torque imparted on the lens by the action of the eyelids, especially for stabilizing toric lenses. The prism ballast is provided on one or more portions of the anterior face of the lens such that the lens body has a uniform thickness of within 10% along horizontal cross-sections. The anterior face of the lens may be segregated into a peripheral zone, an inner zone circumscribed by the peripheral zone, and a central optic zone. The prism ballast portion is provided within the inner zone, which may be further subdivided into a superior portion, an intermediate portion proximate the optic zone, and an inferior portion. The ballast portion increases in thickness along a superior-inferior line parallel to a vertical meridian, and has a substantially uniform thickness perpendicular thereto. The peripheral zone may be tapered, and have a rounded edge. The rate of thickness change across any portion of the peripheral zone is less than about 250 μm/mm.

30 Claims, 7 Drawing Sheets

U.S. PATENT DOCUMENTS

| | | | |
|---|---|---|---|
| 4,573,775 A | 3/1986 | Bayshore | |
| 4,580,882 A | 4/1986 | Nuchman et al. | |
| 4,614,413 A | 9/1986 | Obssuth | |
| 4,618,227 A | 10/1986 | Bayshore | |
| 4,618,229 A | 10/1986 | Jacobstein et al. | |
| 4,680,998 A | 7/1987 | Council, Jr. | |
| 4,702,573 A | 10/1987 | Morstad | |
| 4,820,038 A | 4/1989 | Seger et al. | |
| 4,859,049 A | 8/1989 | Muller | |
| 4,874,234 A | 10/1989 | Wichterle | |
| 5,020,898 A | 6/1991 | Townsley | |
| 5,071,244 A | 12/1991 | Ross | |
| 5,100,225 A | 3/1992 | Rothe | |
| 5,125,728 A | 6/1992 | Newman et al. | |
| 5,341,604 A | 8/1994 | Wood | |
| 5,404,183 A | 4/1995 | Seidner | |
| 5,493,350 A | 2/1996 | Seidner | |
| 5,499,064 A | 3/1996 | Vansaghi | |
| 5,500,695 A * | 3/1996 | Newman | 351/161 |
| 5,526,071 A | 6/1996 | Seidner et al. | |
| 5,532,768 A | 7/1996 | Onogi et al. | |
| 5,608,471 A | 3/1997 | Miller | |
| 5,619,289 A | 4/1997 | Seidner et al. | |
| 5,635,998 A | 6/1997 | Baugh | |
| 5,650,837 A | 7/1997 | Roffman et al. | |
| 5,652,638 A | 7/1997 | Roffman et al. | |
| 5,691,797 A | 11/1997 | Seidner et al. | |
| 5,760,870 A | 6/1998 | Payor et al. | |
| 5,861,114 A | 1/1999 | Roffman et al. | |
| 5,971,542 A | 10/1999 | Volker et al. | |
| 5,988,813 A | 11/1999 | Neadle et al. | |
| 6,089,711 A | 7/2000 | Blankenbecler et al. | |
| 6,092,899 A | 7/2000 | Wanders | |
| 6,109,749 A | 8/2000 | Bernstein | |
| 6,113,236 A | 9/2000 | Chapman et al. | |
| 6,135,594 A | 10/2000 | Windey et al. | |
| 6,158,861 A | 12/2000 | Oyama et al. | |
| 6,176,578 B1 | 1/2001 | Clutterbuck et al. | |
| 6,183,082 B1 | 2/2001 | Clutterbuck | |
| 6,206,520 B1 | 3/2001 | Jubin et al. | |
| 6,234,629 B1 | 5/2001 | Neadle et al. | |
| 6,270,218 B1 | 8/2001 | Clutterbuck | |
| 6,364,483 B1 | 4/2002 | Grossinger et al. | |
| 6,406,145 B1 | 6/2002 | Jubin | |
| 6,454,409 B1 | 9/2002 | Lorenz et al. | |
| 6,457,826 B1 | 10/2002 | Lett | |
| 6,467,903 B1 * | 10/2002 | Back | 351/160 H |
| 6,474,814 B1 | 11/2002 | Griffin | |
| 6,491,392 B1 | 12/2002 | Roffman et al. | |
| 6,568,990 B1 | 5/2003 | Siders et al. | |
| 6,595,639 B1 | 7/2003 | Ho et al. | |
| 6,857,740 B1 * | 2/2005 | Back | 351/160 H |
| 6,971,746 B1 * | 12/2005 | Back | 351/160 H |
| 2002/0021410 A1 | 2/2002 | Ye et al. | |
| 2002/0024631 A1 | 2/2002 | Roffman et al. | |
| 2002/0071094 A1 | 6/2002 | Roffman et al. | |
| 2002/0159025 A1 | 10/2002 | Legerton et al. | |
| 2002/0186345 A1 | 12/2002 | Duppstadt | |
| 2003/0016331 A1 | 1/2003 | Mandell | |
| 2003/0081171 A1 | 5/2003 | Griffin | |
| 2004/0156013 A1 | 8/2004 | Lindacher et al. | |
| 2004/0207807 A1 | 10/2004 | Lindacher | |
| 2004/0257526 A1 | 12/2004 | Lindacher | |
| 2005/0041202 A1 | 2/2005 | Jubin et al. | |
| 2005/0019907 A1 | 3/2005 | Jubin et al. | |
| 2005/0068489 A1 | 3/2005 | Hall et al. | |

FOREIGN PATENT DOCUMENTS

| | | |
|---|---|---|
| CA | 1333757 | 1/1995 |
| EP | 0 440 107 | 8/1991 |
| EP | 0 566 170 | 10/1993 |
| EP | 0 614 105 | 9/1994 |
| EP | 0 741 313 | 11/1996 |
| EP | 0745 876 | 12/1996 |
| EP | 0 980 015 | 2/2000 |
| EP | 1 008 890 | 6/2000 |
| EP | 1 014 156 | 6/2000 |
| FR | 2 582 416 | 11/1986 |
| GB | 1463107 | 2/1977 |
| GB | 2 041 557 | 9/1980 |
| JP | 01187527 A | 7/1989 |
| JP | 11052304 | 2/1999 |
| JP | 2000-214417 | 8/2000 |
| WO | WO 84/04401 | 11/1984 |
| WO | WO 92/22845 | 12/1992 |
| WO | WO 94/23327 | 10/1994 |
| WO | WO 96/08745 | 3/1996 |
| WO | WO 98/45749 | 10/1998 |
| WO | WO 00/48036 | 8/2000 |
| WO | WO 01/16641 | 3/2001 |
| WO | WO 01/29608 | 4/2001 |
| WO | WO 01/44860 | 6/2001 |
| WO | WO 04/015480 | 2/2004 |
| WO | WO 04/068214 | 8/2004 |

OTHER PUBLICATIONS

USPTO Office Action dated Mar. 27, 2003, Patent Application No. 10/171,718, filed Jun. 14, 2002, now U.S. Appl. No. 6,857,740.

USPTO Office Action dated Sep. 23, 2003, U.S. Appl. No. 10/171,718, filed Jun. 14, 2002, now U.S. Appl. No. 6,857,740.

USPTO Office Action dated Dec. 2, 2004, U.S. Appl. No. 10/827,168, filed Apr. 19, 2004, now U.S. Appl. No. 6,971,746.

Office Action dated Feb. 8, 2006 in related U.S. Appl. No. 11/188,069.

Office Action dated Feb. 27, 2006 in related U.S. Appl. No. 11/188,071.

International Search Report dated Jun. 21, 2001 in related PCT application No. PCT/US01/09923.

European Search Report dated Dec. 8, 2004 in related European Application No. EP 01 92 0834.

Notice of Allowance dated Mar. 28, 2005 in U.S. Appl. No. 10/644,638.

Notice of Allowance dated Oct. 6, 2004 in U.S. Appl. No. 10/644,638.

Notice of Allowance/Examiner Interview Summary Record in U.S. Appl. No. 10/635,817 dated Dec. 5, 2005.

Office Action dated Aug. 2, 2005 in U.S. Appl. No. 10/635,817.

Office Action dated Feb. 23, 2005 in U.S. Appl. No. 10/635,817.

International Search Report dated Dec. 22, 2003 in PCT application No. PCT/EP03/08658.

International Search Report dated Nov. 16, 2004 in PCT application No. PCT/US04/022690.

Coopervisions Complaint for Patent Infringement, filed Apr. 10, 2006 in the United District Court Eastern District of Texas, Civil Action No. 2-06CV-149.

CIBA Vision Corporation's Answer and Affirmative Defenses to Coopervision, Inc's Complaint, Filed Jun. 5, 2006, in the United District Court Eastern District of Texas, Civil Action No. 2-06CV-149.

* cited by examiner

CONTACT LENS HAVING A UNIFORM HORIZONTAL THICKNESS PROFILE

RELATED APPLICATION

This is a continuation of application Ser. No. 10/827,168, filed Apr. 19, 2004 now U.S. Pat. No. 6,971,746, which is a continuation of application Ser. No. 10/171,718, filed Jun. 14, 2002, now U.S. Pat. No. 6,857,740, which is a continuation of application Ser. No. 09/818,244, filed Mar. 27, 2001, now U.S. Pat. No. 6,467,903, which claims the benefit of U.S. provisional application No. 60/193,493, filed Mar. 31, 2000. The disclosure of each of these applications is incorporated in its entirety herein by reference.

BACKGROUND OF THE INVENTION

The present invention relates to contact lenses and, in particular, to an improved ballast, preferably a prism ballast, for toric lenses that imposes a low-torque rotational correction on the lens.

Astigmatism is a defect in the eye that is corrected by a lens with a non-spherical prescription. The prescription, which is usually expressed as cylinder on the patient's prescription order, causes at least a portion of the surface of the lens to have the shape of the toric segment. A torus is a surface or object defined by the rotation of a circle about an axis other than its own. For example, a donut has a toroidal shape. The toric portion of the lens is a small oval-shaped section of the toroid, with a major axis and a minor axis. As a result of this non-axi-symmetric configuration, proper rotational orientation of the lens must be maintained. It should be noted that other lenses, for instance that provide bifocal or multi-focal correction, are non-axi-symmetric and thus have a particular orientation outside of which performance suffers.

Astigmatism is often associated with other refractive errors such as myopia or hypermetropia, and so toric contact lenses often also provide some spherical correction, negative or positive. While the concave or posterior surface of a contact lens generally has a spherical configuration, where the lens is used to correct astigmatism the posterior surface will usually have the toric configuration. That is, the curved portion of the posterior surface of the lens has a major axis and a minor axis. The radius of curvature of the posterior surface of the lens is larger in the major-axis direction than in the minor-axis direction. The major diameter of the toric surface is generally smaller in diameter than the overall lens, and is cut into a starting spherical base curve. Additionally, the anterior and/or posterior surface(s) of the optical zone may include a spherical portion that contributes to a distance refractive correction. The spherical correction is typically provided on the exterior or anterior surface. Of course, certain prescriptions provide the toric curve on the anterior surface, with the spherical correction also on the anterior surface, or on the posterior surface.

While spectacle lenses are held rigidly in place by a frame, toric contact lenses must be stabilized so that the cylindrical correction is stabilized in substantially the correct position on the eye. Soft contact lenses which had been designed for use to correct astigmatism are well-known in the art. Generally, these lenses rely on some type of ballasting or stabilizing method to cause the lens to be properly oriented in the eye. The ballast is typically provided on a contact lens by incorporating structures either on the front surface or on the back surface, or spread between both surfaces. Such orientation structures utilize eyelid forces generated during blinking. As the eyelids wipe across the contact lens, they tend to squeeze the lens down and against the cornea and displace elevated surface features.

A so-called "wedge" or "prism" ballast may be utilized wherein the lower or inferior portion of the lens is relatively thicker than the upper or superior portion. As a result, the upper eyelid, which undergoes greater movement than the lower eyelid, and thus exerts greater influence on the contact lens, tends to displace the inferior portion of the contact lens downward, inherently rotating the contact lens over the cornea into the intended orientation. Alternatively, the lens may incorporate a so-called "periballast" (short for peripheral ballast) stabilization that involves a ballast region surrounding but excluding the central optic.

For examples of prism ballast, see U.S. Pat. Nos. 4,573,774, 5,125,728, and 5,020,898, and PCT Publication No. WO 98/45749. Another orientation structure for contact lenses includes the provision of thin superior and inferior zones relative to a thicker central zone. Such structures are shown in U.S. Pat. Nos. 4,095,878, and 5,650,837. Alternatively, channels or ridges may be provided on the contact lens, such as seen in PCT publication No. AU 92/00290.

U.S. Pat. No. 5,020,898 describes a toric contact lens with ballast distributed outside the anterior optical zone such that the ballast thickens from the top of the lens to two points of maximum thickness proximate the lower peripheral edge.

U.S. Pat. No. 5,125,728 also describes a ballast portion that increases from a superior part of the lens to a maximum thickness in the lower periphery on each side thereof. The maximum thickness of the ballast is located as close as possible to the lens edge so that these portions fit over the peripheral cornea and conjunctiva to limit lens rotation. A ballast-free corridor of least resistance is provided in the vertical mid-section of the lens above and below the central optical area. The patent asserts that the ballast-free corridor in combination with the thicker ballast and thicker portions close to the lens periphery provides an improved stabilization mechanism.

Finally, PCT Publication No. WO 98/45749 describes a ballast lens with a prism through the optical zone. The anterior and posterior optical zone diameters are selected such that when combined to form a lens, the thickness at the superior and inferior junctions of the optical zone on the anterior face is controlled.

In addition to the relative ability of a lens to orient consistently on cornea, other factors affect the performance of the various stabilization structures. For example, some structures are better than others with respect to one or more of the following: reducing the overall thickness across the toric contact lens for the physiological benefit of the wearer, ease of manufacture, reducing the lens parameter inventory, clinical performance including wearer comfort and consistency of fitting between refractive powers. With respect to wearer comfort, in general, the thinner the lens and the smoother the surface, the more comfort will be provided. In addition, it is known to provide a periphery on the lens that is relatively thin and shaped for added comfort.

The principal limitation of existing toric contact lens designs is that orientation is highly variable and/or uncomfortable, for a given design, between individual toric lens wearers. Besides the lens design and lens material, patient factors also influence the orientation of a toric contact lens on the eye and contribute to this variability in lens orientation. Patient factors such as blink characteristics and ocular parameters such as eyelid, corneal, and conjuctival shape and anatomy may result in undesired interaction (for example, asymmetry) or insufficient interaction with the contact lens. However, many of the problems associated with prior art mechanisms may be attributed to problems with failure of the stabilization mechanism to maximize eyelid interaction and reduce the variability of lens orientation between individuals.

Despite much effort in this area, there is still a need for a toric contact lens that has more consistent stabilization features between individuals.

SUMMARY OF THE INVENTION

In accordance with the present invention, a contact lens having improved thickness and ballast arrangement is provided. The contact lens of the present invention reduces the known variability of lens orientation from individual to individual. Further, the lenses of the present invention provide more effective interaction between the stabilization mechanism and the eyelid during blinking, and preferably include a peripheral zone that is required for wearer comfort.

In one aspect, therefore, the present invention provides a contact lens, including a contact lens body having a generally spherical base curvature with a convex anterior face, a concave posterior face, and a peripheral edge therebetween. A peripheral zone is defined adjacent the peripheral edge of the anterior face. The body has a thickness between the anterior face and the posterior face and is non-axi-symmetric so as to define a superior edge and an inferior edge. Further, a vertical meridian is defined from the superior edge toward the inferior edge and a horizontal meridian is defined perpendicular thereto. The anterior face defines a plurality of zones thereon, including an inner zone circumscribed by the peripheral zone, and an optic zone defined generally in the middle of the inner zone. Additionally, the lens includes a prism ballast portion whereby the thickness increases parallel to the vertical meridian from the superior edge toward the inferior edge in at least a ballast portion of the inner zone. The inner zone comprises a superior portion between the optic zone and the superior extent of the inner zone, an inferior portion between the optic zone and the inferior extent of the inner zone, and an intermediate portion between the superior and inferior portions. The ballast portion is defined within one or more of the superior, intermediate, and inferior portions and has a series of consecutive horizontal cross-sections exclusive of the peripheral zone and optic zone spanning a distance along the vertical meridian of at least 20% of the smallest dimension of the superior, intermediate, and inferior portions as measured along the vertical meridian, wherein each horizontal cross-section has a substantially uniform thickness not varying by more than about 30 µm or 20%, whichever is greater in absolute terms. In one embodiment, the thickness of the contact lens in each of the consecutive horizontal cross-sections does not vary by more than about 15 µm or about 10%, whichever is greater in absolute terms.

In one embodiment, the ballast portion is defined wholly within only one of the superior, intermediate, and inferior portions. In another embodiment, the ballast portion is defined wholly within only two of the superior, intermediate, and inferior portions. In still another embodiment, the ballast portion is defined within all three of the superior, intermediate, and inferior portions, or comprises the entire inner zone.

In a preferred embodiment, a rate of change of thickness in the tapered peripheral zone is less than about 250 µm/mm, more preferably less than about 200 µm/mm.

In an alternative embodiment, a contact lens of the present invention comprises a contact lens body having a generally spherical base curvature with a convex anterior face, a concave posterior face, and a peripheral edge therebetween. A peripheral zone is defined adjacent the peripheral edge of the lens that tapers thinner toward the peripheral edge of the lens. The lens body has a thickness between the anterior face and the posterior face and is non-axi-symmetric so as to define a superior edge and an inferior edge. A vertical meridian is defined from the superior edge toward the inferior edge and a horizontal meridian is defined perpendicular thereto. The anterior face defines a plurality of zones thereon, including an inner zone circumscribed by the peripheral zone and having a prism ballast portion therein, and an optic zone defined generally in the middle of the inner zone, wherein the thickness increases parallel to the vertical meridian from the superior edge toward the inferior edge in at least the prism ballast portion of the inner zone. Along a 225° meridian, the distance between the inner zone and the peripheral edge is less than about 1.4 mm.

In accordance with one aspect of the invention, a molded contact lens includes a fully molded contact lens body (i.e., molded on both the anterior and posterior faces) having the general features as described above. As before, the molded lens has a prism ballast portion in the inner zone and, along a 225° meridian, the distance between the inner zone and the peripheral edge is less than about 1.8 mm. Alternatively, or desirably in addition, and along a 270° meridian, the distance between the inner zone and the peripheral edge is less than about 2.1 mm, while along a 180° meridian, the distance between the inner zone and the peripheral edge is less than about 1.3 mm.

Desirably, a band circumscribed by the peripheral zone and around the optic zone is substantially annular. Namely, a superior distance A is defined along the vertical meridian and within the inner zone from the optic zone to the peripheral zone. An inferior distance B is defined along the vertical meridian and within the inner zone from the optic zone to the peripheral zone. For molded prism ballasted lenses the band is annular within the range of $0.33A \leq B \leq A$, while for all prism ballasted lenses the annular band is within the range of $0.55A \leq B \leq A$.

Each and every feature described herein, and each and every combination of two or more of such features, is included within the scope of the present invention provided that the features included in such a combination are not mutually inconsistent.

The invention, together with additional features and advantages thereof, may best be understood by reference to the following description taken in connection with the accompanying illustrative drawings in which like parts bear like reference numerals.

DESCRIPTION OF THE PREFERRED EMBODIMENTS

The present invention provides stabilized contact lenses, especially contact lenses having a cylindrical correction for astigmatism. More broadly, the present invention provides contact lenses having elevated surfaces thereon that interact with the blinking action of the eyelids to rotationally stabilize the lens. The rotational stability is useful for any contact lens that is non-axi-symmetric. For example, the rotational orientation of toric lenses or multifocal lenses must be maintained for proper correction. It should be understood, however, that rotational stability may also be desirable for other specialized lenses.

In the following description, a number of surfaces and thicknesses of the contact lenses of the present invention will be described with reference to schematic elevational views of the lenses, in that the lenses have been flattened. Contact lenses typically possess an underlying spherical curvature, with the anterior face being convex, and the posterior face being concave. The various surfaces and optic zones are then either molded or machined from the base sphere. For simplicity, the elevational views shown herein are flattened, with the base sphere removed. In this way, the lines of shading corresponding to the underlying spherical curvature are removed so that the particular surfaces and thicknesses of the present invention can be more clearly illustrated. In a preferred embodiment, lenses of the present invention have a negative spherical power distance correction, and a toric surface for cylindrical correction.

Figure 1:
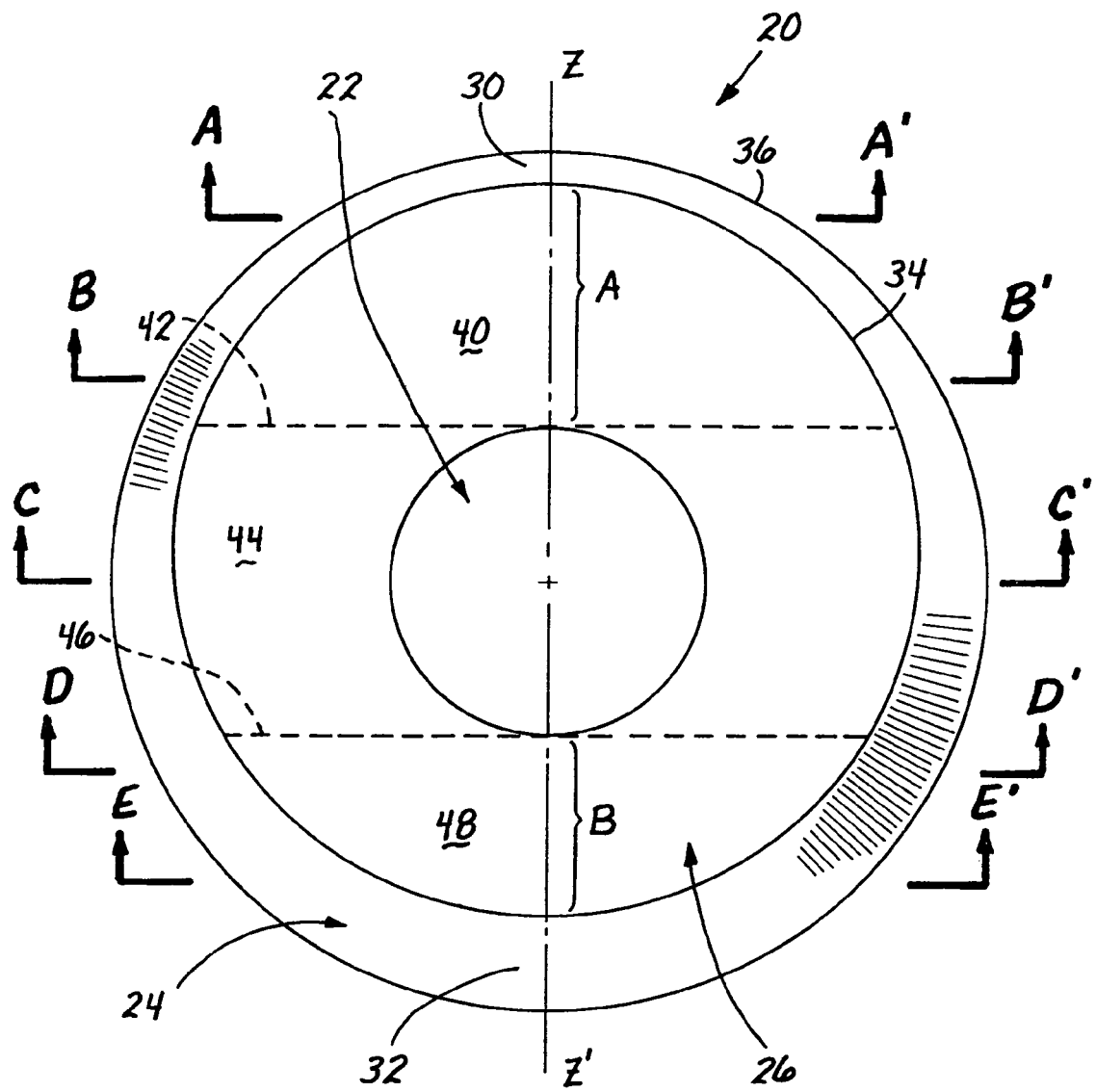
FIG. 1 is a schematic front elevational view of a contact lens according to the present invention illustrating various zones defined thereon.

An exemplary contact lens 20 of the present invention is thus shown in schematic elevational view in FIG. 1 flattened without shading to illustrate various zones thereon. The lens 20 includes a lens body of suitable soft or rigid material. Soft contact lenses are typically made of a hydrophilic material such as hydroxyethylmethacrylate, metallo-organic substances, silicone rubbers, silicone hydrogels, urethanes, etc. Alternatively, a rigid gas-permeable material such as siloxane acrylate or fluorosiloxane acrylate may be used. The lens body has an overall spherical curvature with a concave posterior face adapted to contact the cornea opposite an outwardly-facing convex anterior face.

With reference to FIG. 1, the lens 20 includes an optic zone 22, a peripheral zone 24, and an inner zone 26 circumscribed by the peripheral zone, wherein the optic zone 22 forms a portion of the inner zone 26. Alternatively, the inner zone 26 may be defined between the optic zone and the peripheral zone. As will be described further herein, the optic zone 22 may be circular, toroidal, or other special shapes. The peripheral zone 24 may have a uniform radial dimension (width), or the radial dimension may vary. In the exemplary illustrated embodiment, the peripheral zone 24 has a narrower radial dimension at a superior end 30, and a wider radial dimension at an inferior end 32. Stated another way, the inner zone 26 has a circular periphery or ballast periphery 34 that is slightly offset toward the top of the lens 20 along a vertical meridian or centerline Z–Z' therethrough. It should be noted that the clear delineations in the drawings between the optic zone 22 peripheral zone 24 and inner zone 26 should not be taken to imply that there is a discontinuity or corner at those locations, and in fact the exemplary lens of the present invention possesses gradually curved transitions between the zones.

A lens edge 36 defines the intersection of the anterior and posterior faces. The peripheral zone 24 desirably exhibits a taper so as to be thinner at the lens edge 36 than at the circular ballast periphery 34. In this regard, the peripheral zone 24 preferably defines a partial conical surface (albeit, superimposed on the underlying spherical curvature). Alternatively, the peripheral zone 24 may define a partial spherical or other curvature (i.e., shape), for example, any suitable curvature.

Various features of the lens 20 are believed to enhance wearer comfort in comparison to other similar lenses. Indeed, certain clinical trials resulted in findings that patients responded more favorably to questions designed to ascertain a comfort level of lenses made according to the present invention than with respect to questions on the comfort level of similar lenses.

The inner zone 26 may be segregated into three parts along the vertical meridian Z–Z'. Specifically, a superior portion 40 extends between the upper extent of the ballast periphery 34 and the upper extent of the optic zone 22, delineated by an imaginary line 42, perpendicular to the vertical meridian Z–Z'. An intermediate portion 44 extends between the perpendicular line 42 and a second perpendicular line 46 at the lower extent of the optic zone 22. Finally, an inferior portion 48 extends between the perpendicular line 46 and the lower extent of the ballast periphery 34. The optic zone 22 thus lies entirely within the intermediate portion 44.

The superior portion 40, intermediate portion 44, and inferior portion 48 are used in the present application to segregate the inner zone 26 into discrete areas in which specific ballast surfaces can be provided. It should be understood, however, that the dividing lines 42, 46 between the areas may be shifted, or may be non-linear, for that matter. In one aspect, the present invention concerns particular ballast or prism ballast surfaces/thicknesses in one or more portions of the inner zone 26, which portions may be defined in a number of ways. Therefore, the reader will understand that the portions 40, 44, and 48 are shown as exemplary only. Desirably, iso-thickness ballast surfaces are formed in at least 20% (measured as a percent of the vertical dimension), preferably at least 50%, and more preferably at least 100%, of at least one of the portions 40, 44, and 48. More specifically, an iso-thickness prism ballast portion is defined within one or more of the superior, intermediate, and inferior portions 40, 44, and 48 as a series of consecutive horizontal cross-sections exclusive of the peripheral zone and optic zone spanning a distance along the vertical meridian of at least 20% of the smallest dimension of the superior, intermediate, and inferior portions as measured along the vertical meridian. The term "iso-thickness" means that each of the consecutive horizontal cross-sections has a substantially uniform thickness not varying by more than about 30 μm or 20%, whichever is greater in absolute terms. In a particularly preferred construction, ballast surfaces are provided in at least two, more preferably all three of the portions 40, 44, and 48.

The present invention pertains to contact lenses having rotational stabilization mechanisms thereon, including those with ballasts, e.g., prism ballasts, periballasts, and so-called "dynamically stabilized" lenses. A ballasted lens provides some raised surface contour over which the eyelid wipes to re-orient the lens, generally about its optical axis. A prism ballast provides a wedge or tapered ballast for interaction with the eyelids even in the optic, while a periballast is exclusive of the optic. Dynamic stabilization involves superior and inferior flats on the lens leaving a thickened midsection to interact with the eye, as seen in U.S. Pat. No. 4,095,878. Those of skill in the art will also recognize that there may be other such stabilization mechanisms with which the present invention could be advantageously used.

Figure 2:
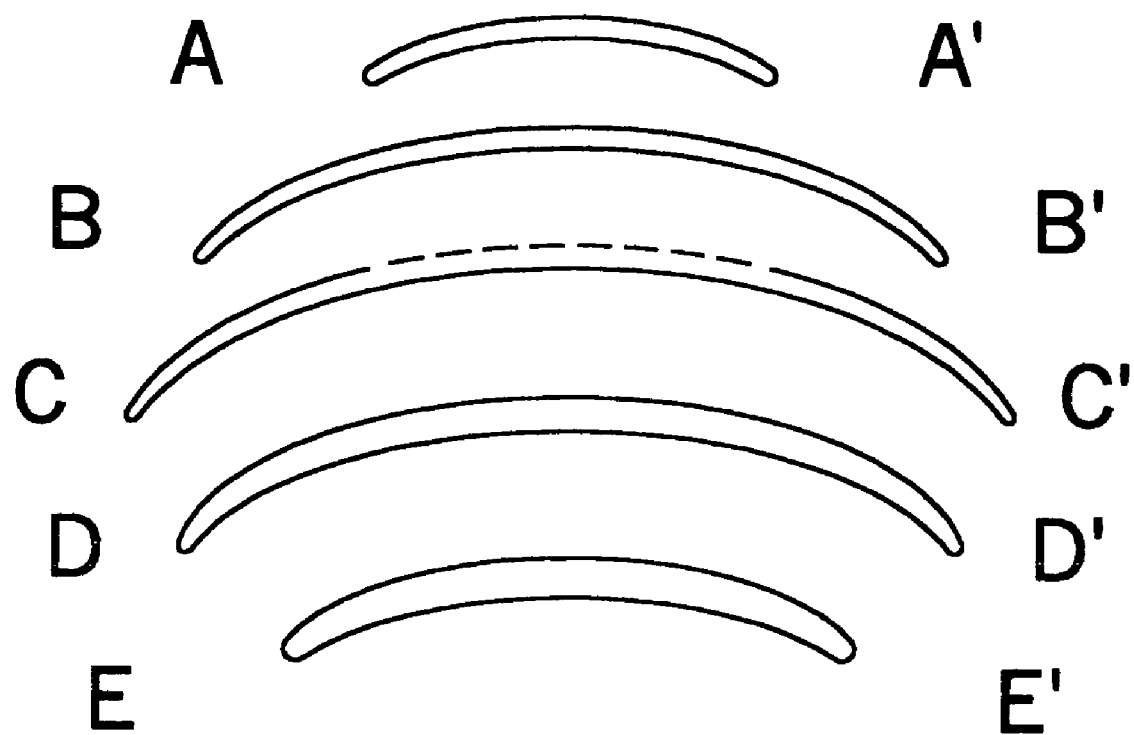
FIG. 2 (A–A' to E–E') illustrate a series of horizontal cross-sections taken through the lens of FIG. 1.

FIG. 1 also illustrates a number of representative cross-sectional lines A–A', B–B', C–C', D–D', and E–E' extending perpendicularly with respect to the vertical meridian Z–Z' (i.e., horizontally). These sections are illustrated in FIG. 2, with the base spherical curvature shown. The present invention provides that consecutive horizontal cross-sections shown in FIG. 2 that possess ballast each has a substantially uniform or iso-thickness, except in the optic zone 22 and peripheral zone 24. For example, one of the cross-sections in FIG. 2 having ballast, such as D–D', has a substantially uniform thickness. Alternatively, all of the cross sections shown in FIG. 2 that possess ballast may have a uniform thickness except in the optic zone 22 and peripheral zone 24.

Desirably, the sections of substantially uniform thickness do not vary in thickness within one section by more than about 30 μm or about 20% whichever is greater in absolute terms. In one embodiment, the thickness of the sections varies by no more than about 15 μm or about 10%, such as by no more than about 10 μm or about 7%, whichever is greater. Such variations will be understood to be sufficiently small that the sections can still be regarded as being of "substantially uniform" thickness.

In an exemplary embodiment of the present invention, the contact lens 20 has a so-called prism ballast superimposed thereon within the entire inner zone 26. That is, from the intersection of the ballast periphery 34 with the vertical meridian Z–Z' at the top of the lens 20, to the intersection between the same two lines at the bottom of the lens, the thickness generally increases. This thickness distribution along the vertical meridian Z–Z' is graphically illustrated in FIG. 3, with the superior end 30 of the peripheral zone 24 shown at the right and the inferior end 32 shown at the left. Starting at the right side, the taper of the peripheral zone 24 within the superior end 30 from the edge 36 to the upper extent of the ballast periphery 34 is seen. In the superior portion 40, the thickness gradually increases to the horizontal line 42. The thickness further increases through the optic zone 22 to the horizontal line 46. The greatest thickness is in the inferior portion 48 to the lower extent of the ballast periphery 34. The lens again tapers downward within the peripheral zone 24 between the ballast periphery 34 to the inferior edge 36.

Figure 3:
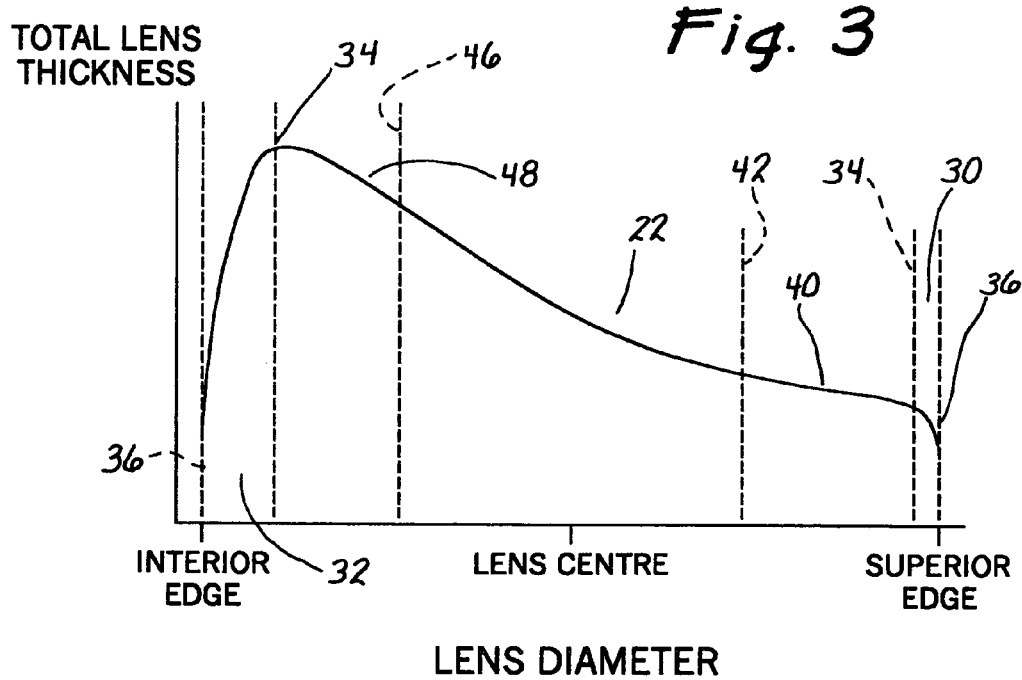
FIG. 3 is a graph showing the varying thickness of the contact lens of FIG. 1 taken along a vertical meridian Z–Z'.

The thickness distribution represented in FIG. 3 thus corresponds to a prism ballast within the lens 20 that extends through all of the superior portion 40, intermediate portion 44, and inferior portion 48. Indeed, even the optic zone 22 exhibits this prism ballast. Importantly, the present invention provides a prism ballast in at least one of these portions 40, 44, 48 having horizontal cross-sections of uniform thickness. Therefore, as seen in FIG. 2, all of the cross-sections illustrated have uniform thicknesses along their widths, except in the peripheral zone 24 of course, because of the increasing thickness in the superior-inferior direction parallel to the vertical meridian Z–Z', the thickness of each cross-section increases from cross-section A–A' to cross-section E–E'.

The uniform thickness in the horizontal cross-sections helps to stabilize lenses of the present invention, in contrast to previous lenses. More specifically, lenses of the present invention are suitable for a greater number of wearers than those of the prior art because of the lower torque exerted by the eyelids on the lens by virtue of the uniform thickness or iso-thickness configuration. The iso-thickness ballast arrangement maximizes eyelid interaction by achieving an even contact across each section of the lens as the eyelid travels down and up the lens during blinking. In contrast, the eyelid generates more rotational torque during a normal blink when interacting with horizontal lens sections of non-uniform thickness, as in the prior art. This is because for a lens to orient appropriately on the eye the lens-eyelid interaction should be maximized across the lens (i.e., across each horizontal cross-section) so that the lens is squeezed into the desired orientation (overall orientation) and undergoes minimal fluctuation during blinking (interblink orientation).

Prior art lenses, having narrow peaks or points of maximum thickness on either side of the vertical meridian are more likely to create a non-uniform lens-eyelid interaction across horizontal sections. In addition, the horizontal distance between peaks of maximum thickness in the prior art lenses typically increases from a superior portion to the horizontal midline, and then decreases from the mid-line to the inferior portion. This further varies the lens-eyelid interaction forces.

The uniform thicknesses in the horizontal cross-sections of the lens 20 have proven to enhance performance of the lenses in comparison to other similar lenses in terms of maintaining a correct rotational orientation in the eye. Clinical trials have shown that there is less variability in the position of a location mark on the lens over time. For example, groups of 20 people at a time were studied to determine the positions of location marks over time on various lenses in the eye, and the standard deviations of the positions of the location marks were determined. The results are that the standard deviation for lenses of the present invention are measurably smaller than in other lenses, meaning the present lenses had less rotational instability in the eye.

Figure 4B:
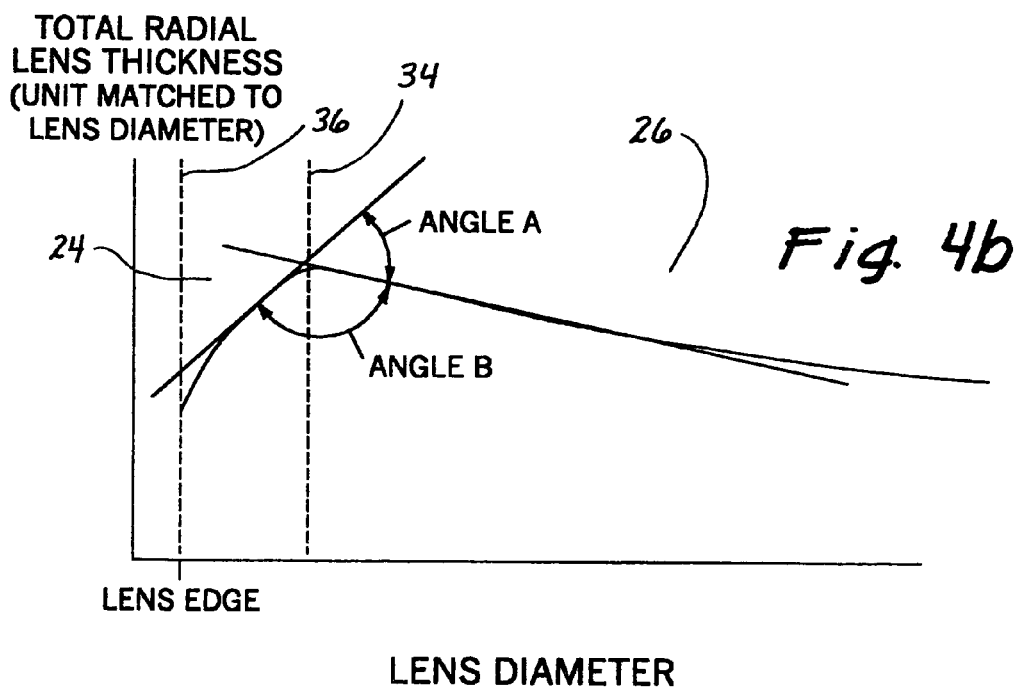
FIG. 4b is a graph of a portion of the contact lens of the present invention illustrating a discontinuity and angular relationship between zones thereon.
Figure 4A:
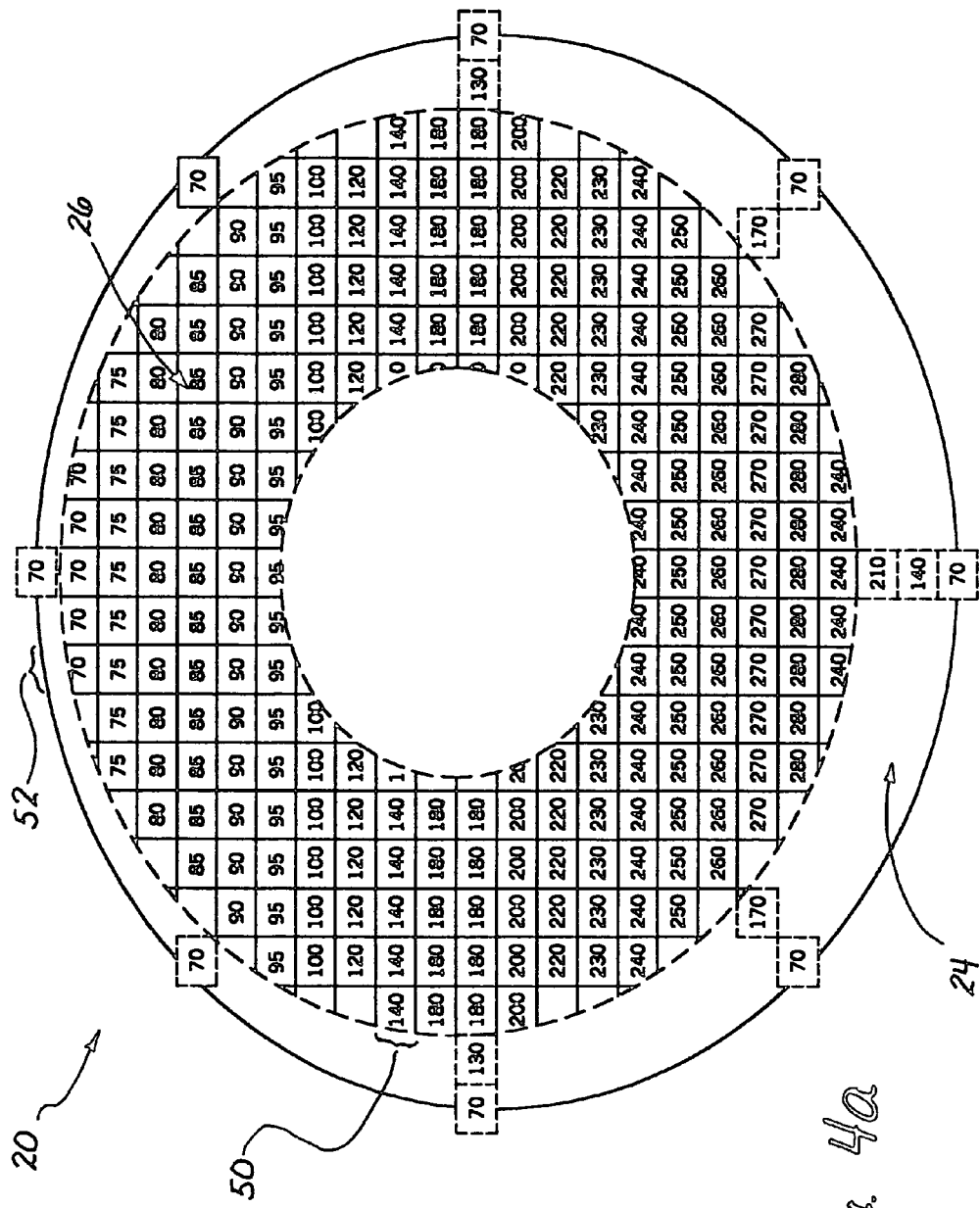
FIG. 4a is a schematic diagram of the contact lens of the present invention having an exemplary topographical numerical thickness map superimposed thereon.

Exemplary values for the thickness of the contact lens 20 having the distribution as seen in FIG. 3 are provided in the topographical depiction of FIG. 4a. It is understood that the contact lens 20 shown in FIG. 4a is generally circular. In FIG. 4a, the inner zone 26 is divided by horizontal and vertical grid lines into a plurality of discrete units. Each horizontal row of units has a uniform thickness throughout the inner zone 26. On the other hand, the thickness along a vertical column of units generally increases from the superior to the inferior. For example, horizontal row 50 has a uniform thickness of 140 μm other than in the optic zone. Vertical column 52 has a thickness of 70 μm at the top, gradually increases to 280 μm, and begins to decrease just prior to the inferior portion of the peripheral zone 24. The values provided in FIG. 4a are exemplary and are suitable for a soft hydrogel contact lens. The values for lenses made of other materials may vary depending on the optical or other properties of the particular material.

It will be understood by the reader that the discrete units mapped in FIG. 4a represent the average thickness within each unit. That is, the thickness down the lens 20 changes gradually, rather than at a stepped border between units. More generally, although the present application describes distinct zones or portions in contact lenses, those zones are shown for clarity of description of the invention only. It will be appreciated by those skilled in the art that there are no sharp distinctions between these different zones of the lens, but that they are instead smoothly blended into one another.

FIG. 4a also illustrates the decreasing thickness or taper of the lens 20 through the peripheral zone 24. For example, at the inferior midpoint, the thickness decreases from 210–140–70 μm. This is also seen in the graph of FIG. 3. This taper within the peripheral zone 24 provides a so-called comfort zone around the edge of the lens 20. Because of the reduced thickness, movement of the eyelids across the contact lens is facilitated, and there is less irritation. Specifically, the eyelids more easily travel over the tapered peripheral zone 24 than if there were a more abrupt thickness change.

In an exemplary embodiment, the lens 20 has a corneal fitting relationship to maintain the lens centered on the cornea. The preferred lens has a diameter sufficient to achieve corneal coverage, and optimum stability is provided so that the lens does not become loose and unstable with gaze and blinking, which may influence the comfort and vision of the wearer. The sagittal depth (concave depth of the posterior face) for an optimum lens-cornea fitting relationship is between about 3.0 and 5.0 mm over a lens diameter of between about 13.0 mm and 16.0 mm. The lens diameter is more preferably between about 13.5–14.8 mm. A preferred thickness of the lens edge 36 is less than about 120 μm, more preferably about 90 μm. In this respect, the thickness is measured radially with respect to the curvature of the anterior face. The extreme outermost extent of the edge 36 may incorporate a preferred rounding of the anterior edge corner.

A plurality of meridian lines may be defined through the center of the lens. In a preferred embodiment, for maximum wearer comfort, the rate of change in lens radial thickness from the end of the ballast zone 34 to the lens edge 36 (i.e., in the peripheral zone 24) is less than about 250 μm/mm along any meridian of the lens. For example, in the topographical map of FIG. 4a, the rate of change of thickness along any meridian and within the peripheral zone 24 is less than about 250 μm/mm. More preferably, the rate of change in the peripheral zone 24 is less than about 200 μm/mm.

Figure 7:
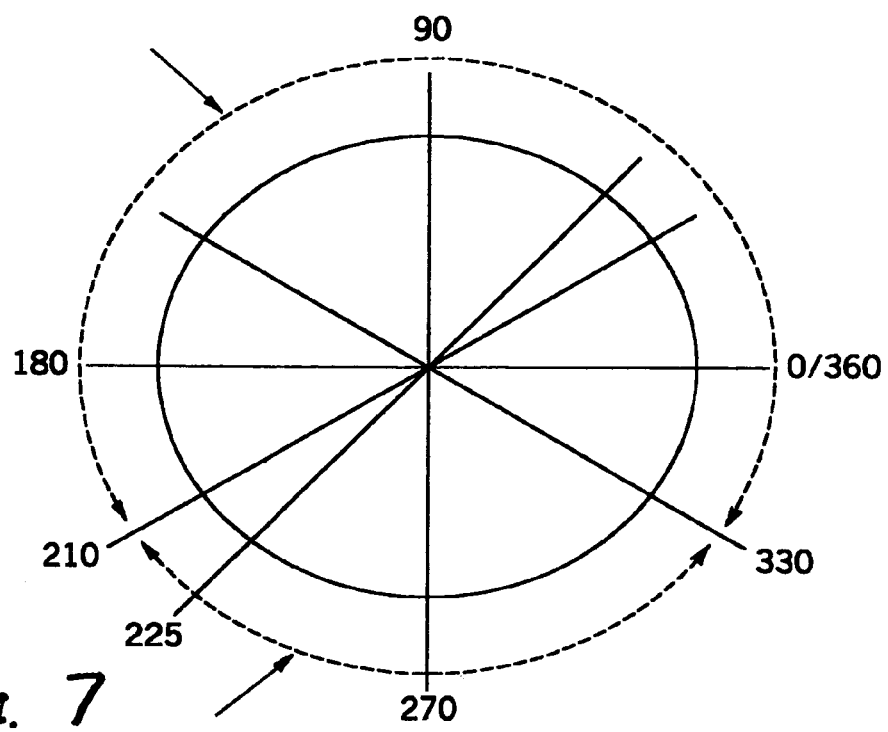
FIG. 7 is a schematic front elevational view of a contact lens having a number of meridian lines superimposed thereon for reference.

The advantageous interaction between the peripheral zone 24 and the iso-thickness is further exemplified in the proximity to the lens edge 36 of the point of maximum thickness, as variously measured around the lens. To illustrate this principle, FIG. 7 shows various meridians through the optical axis and around the lens in degrees, starting at the 3:00 o'clock position and moving counterclockwise. Of course, with iso-thickness in the inner zone 26, the point of maximum thickness along any horizontal meridian corresponds to the thickness along the entire horizontal meridian excluding the optical zone. Therefore, the beginning of the inner zone 26 and the point of maximum thickness along any meridian always lies on the ballast periphery 34. However, because of the preferred ballasting, the maximum thickness changes around the ballast periphery 34.

For prism ballasted lenses in accordance with the present invention, and along the 225° meridian, the distance between the point of maximum thickness (e.g., the ballast periphery 34) and the lens edge 36 is no greater than about 1.4 mm, regardless of the thickness. For any type of ballasted lens, the maximum thickness along the 225° meridian in accordance with the present invention is between about 200–400 μm, preferably between about 250–350 μm, and more preferably about 320 μm. Along the 270° meridian, the distance between the point of maximum thickness (e.g., the ballast periphery 34) and the lens edge 36 is no greater than 1.8 mm, also regardless of the thickness, though a thickness of about 320 μm is preferred. For fully molded prism ballasted lenses (i.e., molded on both the anterior and posterior faces), and along a 225° meridian, the distance between the point of maximum thickness (e.g., the ballast periphery 34) and the peripheral edge is less than about 1.8 mm, and desirably, along a 270° meridian, the distance between the point of maximum thickness and the peripheral edge is less than about 2.1 mm. Also, along a 180° meridian, the distance between the inner zone and the peripheral edge is less than about 1.3 mm. In general, the peripheral zone 24 of the lenses of the present invention is relatively narrow in comparison to the prior art ballasted lenses, yet because of the preferred thicknesses the comfort taper angle in the peripheral zone 24 is relatively shallow, as mentioned above.

Although the preferred lens of the present invention has smooth, rounded transitions between different portions thereon, discrete boundaries or corners are not excluded. For example, the transition between the peripheral zone 24 and the inner zone 26 may be defined by a rounded corner or discontinuity at the circular ballast periphery 34. An example of the transition between the ballast area 26 and the peripheral zone 24 (i.e., at 34) along the meridian Z–Z' is seen in FIG. 3.

Figure 5A:
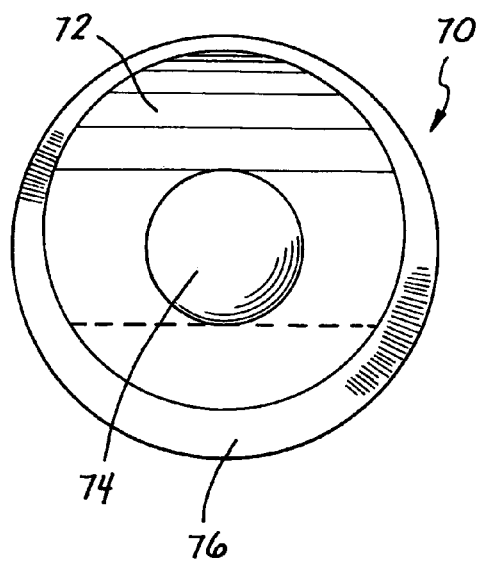
FIGS. 5a–5d are elevational views of contact lenses of the present invention each having a spherical anterior optical zone and varying regions of substantially uniform horizontal thickness.
Figure 5B:
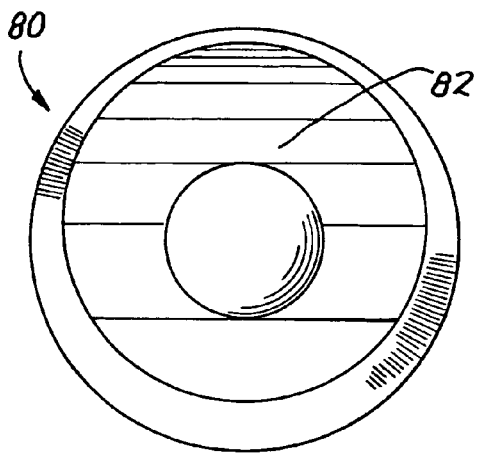
Figure 5C:
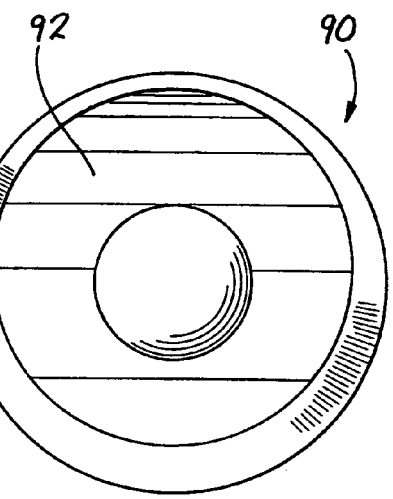
Figure 5D:
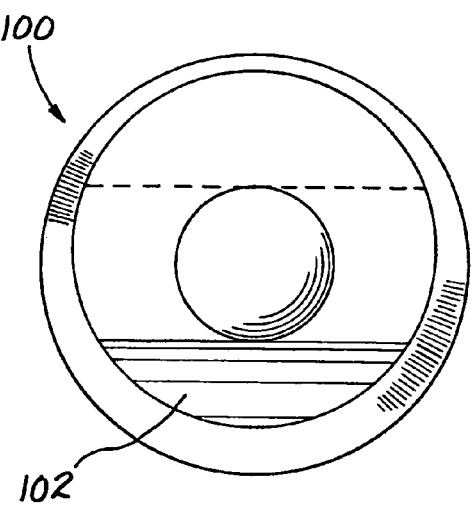

FIGS. 5a–5d illustrate several variations of the contact lens of the present invention having different ballast portions defined within the ballast zone. For purpose of explanation, the reader will refer back to FIG. 1 for the definition of the various portions (i.e., superior, intermediate, and inferior) of the inner zone 26. FIG. 5a shows a contact lens 70 having a ballast portion 72 defined within the superior portion of the inner zone. Again, the inner zone lies between an optic zone 74 and a peripheral zone 76. FIG. 5b illustrates a contact lens 80 of the present invention having a ballast portion 82 defined within both the superior and intermediate portions of the inner zone. FIG. 5c shows a contact lens 90 having a ballast portion 92 defined within the entire inner zone, through the superior, intermediate, and inferior portions thereof. Finally, FIG. 5d illustrate a contact lens 100 having a ballast portion 102 defined only within the inferior portion of the inner zone.

Other variations not shown include a ballast portion defined wholly within either the intermediate or inferior portions of the inner zone, or within the intermediate and inferior portions combined, exclusive of the superior portion. Also, the ballast portion could surround the optic zone in a so-called "periballast" arrangement, or could continue through the optic zone in a so-called "prism ballast" arrangement.

FIGS. 6a–6d illustrate a number of other contact lenses of the present invention having a cylindrical correction on the anterior face thereof. More specifically, a toric optic zone 110 is shown in each of the lenses oriented along a major axis 112 that is rotated with respect to the superior-inferior axis of the lens. The need for proper ballasting for the lenses is thus apparent to maintain the proper offset orientation of the axis 112.

Figure 6A:
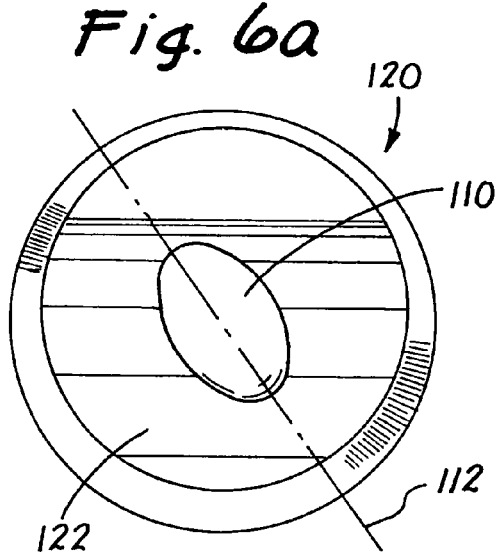
FIGS. 6a–6d are elevational views of contact lenses of the present invention each having a toric anterior optical zone and varying regions of substantially uniform horizontal thickness.
Figure 6B:
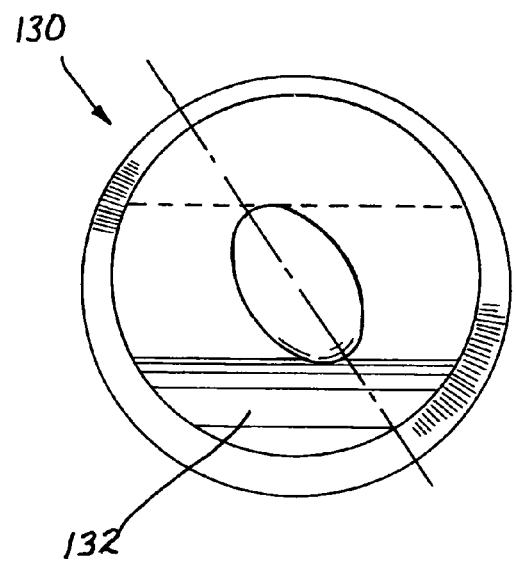
Figure 6C:
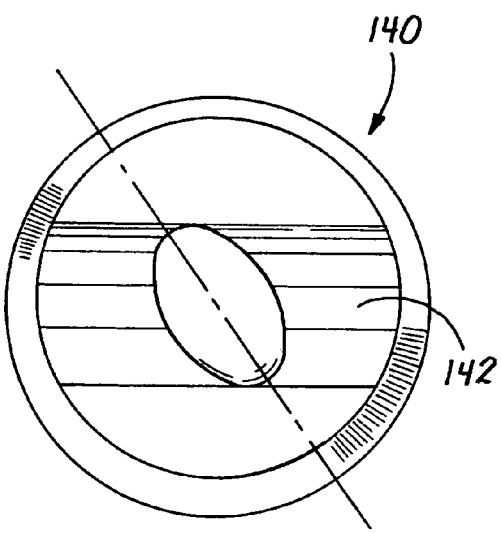
Figure 6D:
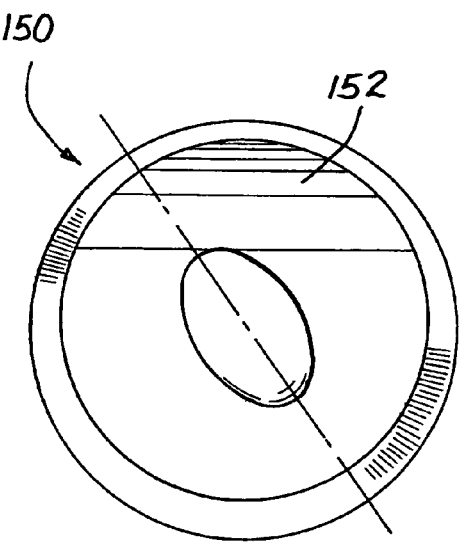

FIG. 6a shows a contact lens 120 having a ballast portion 122 beginning in the superior portion and continuing through both the intermediate and inferior portions of the inner zone. FIG. 6b shows a contact lens 130 having a ballast portion 132 located entirely within the inferior portion of the inner zone. FIG. 6c depicts a contact lens 140 having a ballast portion 142 wholly within the intermediate portion of the inner zone. Finally, FIG. 6d shows a lens 150 having a ballast portion 152 only within the superior portion of the inner zone.

Figure 8:
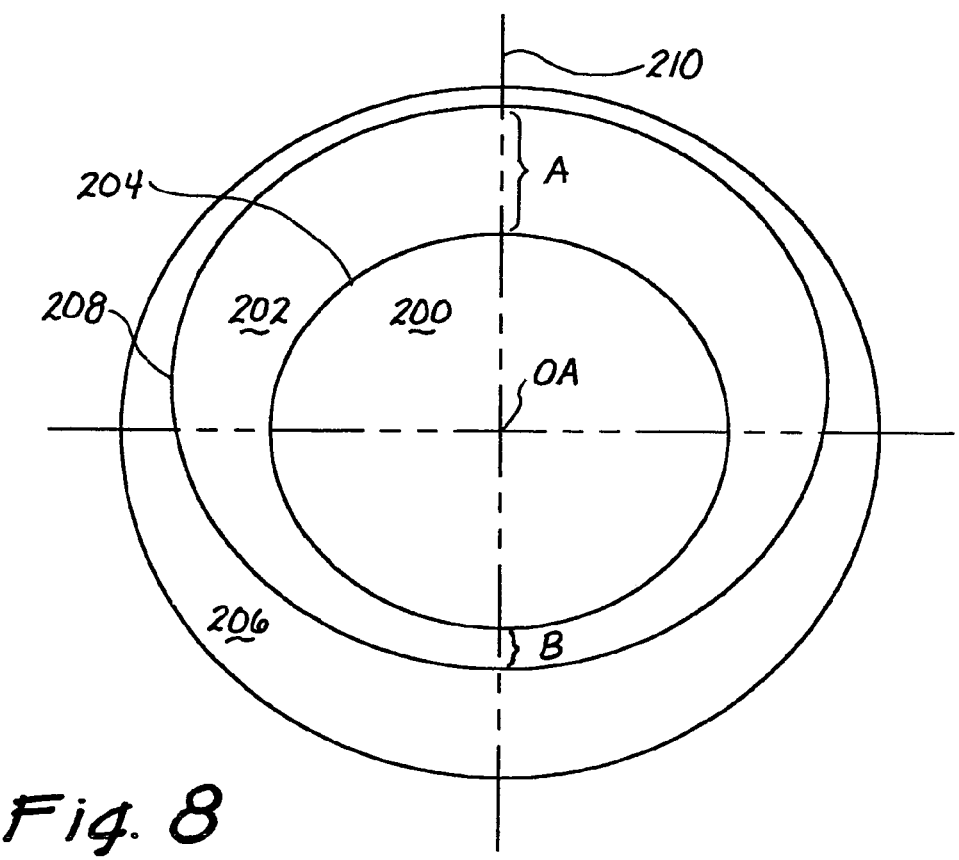
FIG. 8 is a schematic front elevational view of a contact lens of the prior art illustrating various zones defined thereon.

FIG. 8 shows a prism ballast lens of the prior art (CooperVision Frequency Xcel (Encore) Toric) with lines demarking the transitions between various zones drawn. Specifically, an optic zone 200 is separated from a ballast zone 202 by a generally circular inner line 204, and the ballast zone is separated from a peripheral zone 206 by a generally circular outer line 208. While the inner line 204 is approximately centered as expected on the optical axis OA, the outer line 208 is offset upward along the vertical meridian 210. As a result, the ballast zone 202 is wider in the superior region than the inferior. Specifically, the superior radial width A of the ballast zone 202 is significantly greater than the inferior radial width B. Indeed, the superior radial width A is more than twice the inferior radial width B.

In contrast, as seen in FIG. 1, the lenses of the present invention have an inner zone 26 that is substantially annular, with a radial dimension A that is within about 300% of the radial width B. That is, for molded prism ballasted lenses the band is annular and the relationship $0.33A \leq B \leq A$ holds. Alternatively, for all prism ballasted lenses the annular band is within the range of $0.55A \leq B \leq A$.

It will be appreciated that the present invention may be embodied in lenses having varying optical powers. For example, a contact lens of present invention may have an optic power of about between about −8 to about +8 diopters, although this range is not to be considered limiting.

Additionally, the contact lenses according to the present invention may also comprise stabilization features other than the uniform thickness ballast arrangement. For example, the peripheral zone may include a flattened region for dynamic stabilization, or the lens may incorporate a periballast stabilization outside of the central optic.

While this invention has been described with respect to various specific examples and embodiments, it is to be understood that the invention is not limited thereto and that it can be variously practiced within the scope of the following claims.

What is claimed is:

1. A contact lens, comprising:
    an optic zone; and
    a second zone circumscribing the optic zone, the second zone comprising a superior region, an inferior region, and an intermediate region located between the superior region and inferior region,
    wherein the second zone varies in thickness by at least about 200 µm, and
    the superior region has a reduced thickness relative to the intermediate region and comprises a plurality of horizontally oriented iso-thickness bands extending from a superior edge of the second zone toward the intermediate region of the second zone, each band having a thickness that is different from each adjacent band, and the thickness of the superior region increases from the superior edge towards the intermediate region.

2. The contact lens of claim 1 which is a toric contact lens or multifocal contact lens.

3. The contact lens of claim 1, wherein the superior region contacts the intermediate region at a non-linear contact line.

4. The contact lens of claim 1, wherein the second zone varies in thickness by 210 µm.

5. The contact lens of claim 1, wherein the iso-thickness bands are parallel to a horizontal meridian of the contact lens.

6. The contact lens of claim 1, wherein the superior region is symmetrical about a vertical meridian of the contact lens.

7. The contact lens of claim 1, wherein the second zone comprises a ballast.

8. The contact lens of claim 7, wherein the ballast is located in one region selected from the group consisting of the superior region, the intermediate region, and the inferior region.

9. The contact lens of claim 7, wherein the ballast is located in the intermediate region and the inferior region.

10. The contact lens of claim 7, wherein the ballast is located in the superior region, the intermediate region, and the inferior region.

11. The contact lens of claim 7, wherein the ballast is selected from the group consisting of prism ballasts and periballasts.

12. The contact lens of claim 1, wherein the thickness of the superior region increases non-linearly from the superior edge of the second zone toward the intermediate region.

13. The contact lens of claim 1, wherein the thickness of the second zone increases non-linearly from the superior edge of the second zone towards the inferior region.

14. The contact lens of claim 1 which comprises a silicone hydrogel.

15. The contact lens of claim 1, further comprising a peripheral edge, and wherein, along a 225° meridian, the distance between the second zone and the peripheral edge is less than about 1.4 mm.

16. A contact lens, comprising
    an optic zone; and
    a second zone circumscribing the optic zone, the second zone comprising a stabilization structure including at least one region extending across the entire second zone and having a substantially uniform horizontal thickness, the stabilization structure being effective to rotationally stabilize the contact lens on an eye of an individual, the second zone having a maximum thickness at a region located between a superior boundary of the second zone and an inferior boundary of the second zone.

17. The contact lens of claim 16 which is a dynamically stabilized contact lens.

18. The contact lens of claim 16, wherein the second zone comprises a ballast.

19. The contact lens of claim 18, wherein the ballast is selected from the group consisting of periballasts and prism ballasts.

20. The contact lens of claim 16 which is a toric contact lens or a multifocal contact lens.

21. The contact lens of claim 16, wherein the second zone is asymmetric about the horizontal meridian of the contact lens.

22. The contact lens of claim 16 which comprises a silicone hydrogel.

23. The contact lens of claim 22, further comprising a rounded edge located at the intersection of an anterior surface and posterior surface of the contact lens.

24. The contact lens of claim 16, wherein the second zone comprises a plurality of iso-thickness bands.

25. The contact lens of claim 24, wherein the iso-thickness bands are oriented substantially parallel to a horizontal meridian of the contact lens.

26. The contact lens of claim 16 wherein the second zone is free of horizontally extending waveforms.

27. The contact lens of claim 16, further comprising a peripheral edge, and wherein, along a 225° meridian, the distance between the second zone and the peripheral edge is less than about 1.4 mm.

28. A contact lens, comprising
a dynamically stabilized lens body comprising an optic zone, a superior region, an inferior region, and an intermediate region located between the superior region and the inferior region, the intermediate region having a greater thickness relative to at least one of the superior region and the inferior region; and at least one of the superior region, the inferior region, and the intermediate region comprising a plurality of substantially horizontal iso-thickness lines extending across the entire at least one of the superior region, the inferior region and the intermediate region exclusive of the optic zone and being effective in facilitating rotational stabilization of the contact lens on an eye of an individual.

29. The contact lens of claim 28 wherein the at least one of the superior region, the inferior region and the intermediate region exclusive of the optic zone is free of horizontally extending waveforms.

30. The contact lens of claim 28 which comprises a silicone hydrogel.

* * * * *

UNITED STATES PATENT AND TRADEMARK OFFICE
CERTIFICATE OF CORRECTION

PATENT NO. : 7,133,174 B2  Page 1 of 1
APPLICATION NO. : 11/188190
DATED : November 7, 2006
INVENTOR(S) : Back It is certified that error appears in the above-identified patent and that said Letters Patent is hereby corrected as shown below:

Column 4
Lines 38, "within the range of 0.33A≦B≦A," should read --within the range of 0.33A ≤ B ≤ A,--.

Column 4
Lines 40, "within the range of 0.55A≦B≦A" should read --within the range of 0.55A ≤ B ≤ A--.

Column 11
Lines 26, "the relationship 0.33A≦B≦A holds" should read --the relationship 0.33A ≤ B ≤ A holds--.

Column 11
Lines 28, "within the range of 0.55A≦B≦A" should read --within the range of 0.55A ≤ B ≤ A--.

Column 12
Line 63, Claim 25, "Thecontact lensof claim 24" should read --The contact lens of claim 24--.

Signed and Sealed this

Twentieth Day of May, 2008

JON W. DUDAS
*Director of the United States Patent and Trademark Office*

Disclaimer and Dedication

7,133,174 B2—Arthur Back, Danville, CA (US). CONTACT LENS HAVING A UNIFORM HORIZONTAL THICKNESS PROFILE. Patent dated November 7, 2006. Disclaimer filed January 12, 2012, by the assignee, Coopervision International Holding Company, LP.

Hereby disclaims and dedicates to the public, all claims 1-30 of said patent.

*(Official Gazette, February 14, 2012)*